(12) United States Patent
Davis et al.

(10) Patent No.: US 7,210,166 B2
(45) Date of Patent: Apr. 24, 2007

(54) METHOD AND SYSTEM FOR SECURE, ONE-TIME PASSWORD OVERRIDE DURING PASSWORD-PROTECTED SYSTEM BOOT

(75) Inventors: Mark Charles Davis, Durham, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 389 days.

(21) Appl. No.: 10/967,761

(22) Filed: Oct. 16, 2004

(65) Prior Publication Data
US 2006/0085845 A1   Apr. 20, 2006

(51) Int. Cl.
  H04L 9/00    (2006.01)
  G06F 15/177  (2006.01)
  G06F 17/30   (2006.01)
(52) U.S. Cl. .................. 726/6; 713/2; 380/268
(58) Field of Classification Search ............. 726/6; 713/2; 380/268
  See application file for complete search history.

(56) References Cited

U.S. PATENT DOCUMENTS

| | | | |
|---|---|---|---|
| 5,768,373 A | 6/1998 | Lohstroh et al. | |
| 5,964,877 A | 10/1999 | Victor et al. | |
| 6,145,085 A | 11/2000 | Tran et al. | |
| 6,160,891 A | 12/2000 | Al-Salqan | |
| 6,370,649 B1 | 4/2002 | Angelo et al. | |
| 6,397,337 B1 | 5/2002 | Garrett et al. | |
| 6,460,139 B1 | 10/2002 | Heinrich et al. | |
| 2003/0182584 A1 | 9/2003 | Banes et al. | |

OTHER PUBLICATIONS

Weaknesses and drawbacks of a password authentication scheme using neural networks for multiserver architecture Wei-Chi Ku; Neural Networks, IEEE Transactions on vol. 16, Issue 4, Jul. 2005 pp. 1002-1005.*
Networked cryptographic devices resilient to capture MacKenzie, P.; Reiter, M.K.; Security and Privacy, 2001. S&P 2001. Proceedings. 2001 IEEE Symposium on May 14-16, 2001 pp. 12-25.*
A remote password authentication scheme for multiserver architecture using neural networks Li-Hua Li; Luon-Chang Lin; Min-Shiang Hwang; Neural Networks, IEEE Transactions on vol. 12, Issue 6, Nov. 2001 pp. 1498-1504.*

* cited by examiner

Primary Examiner—David Jung Au
(74) Attorney, Agent, or Firm—Scott W. Reid; Dillon & Yudell LLP (57) ABSTRACT

A method, system, and program product for enabling administrative recovery of a user's lost/forgotten boot-up passwords without compromising the administrative/master password(s). A restricted-use password is dynamically generated from a first hash of a random number generated on a client system and a secret retrieved from a secure device associated with the client system. The restricted-use password operates as a master password but is not the administrative password of the client system. Once the password is generated, it is provided to the user/client system to enable user access to said client system and hardfile and reset of the user passwords.

22 Claims, 6 Drawing Sheets

METHOD AND SYSTEM FOR SECURE, ONE-TIME PASSWORD OVERRIDE DURING PASSWORD-PROTECTED SYSTEM BOOT

BACKGROUND OF THE INVENTION

1. Technical Field

The present invention relates generally to computer systems and more specifically to password security features of computer systems. Still more particularly, the present invention relates to enabling secure access to computer systems when power-up passwords are lost or forgotten.

2. Description of the Related Art

Computer systems that are operated within an administered network are often provided boot-up security password(s) to prevent access by persons other than the authorized user(s) and/or the administrator. The user-password is typically selected by the user during system setup, and this user-password is stored within a non-volatile memory component of the computer system. Entry of the user-password is required for the boot process initiated by the basic input/output system (BIOS) once the computer system has been powered-on or awakened from hibernation.

With traditional computer systems, passwords were typically stored in battery-backed CMOS RAM. Before users were allowed to access the computer system, they were required to enter a password. When a password is entered, the computer's boot-up routine compares the entered password to the password stored in CMOS RAM and if the two passwords matched, the user is allowed access to the computer system.

Limitations exist in the use of CMOS RAM to store passwords. For example, if a computer system is stolen, the security afforded by passwords stored in battery-backed CMOS RAM may be bypassed. An unauthorized user may open the box and remove the CMOS RAM battery in order to gain access to the system. When the CMOS RAM battery is removed, the storage area of the password is cleared (wiped out). Then, when the CMOS RAM battery is reinstalled, the system powers-up without a password, allowing an unauthorized user to access the computer system.

Thus, to avoid such breaches in security passwords, conventional computer systems are designed with the passwords stored in non-volatile memory. When stored in non-volatile memory, the password cannot be bypassed by removing the CMOS RAM battery. However, even this method has built-in limitations, as there is no way for legitimate users, who loses/forgets his/her password to access the computer system without using the administrative password. Occasionally, with both small and large networks, the administrator is unavailable at the time the user requires assistance with accessing the computer. Also, it is quire common for the administrator to have to provide the user with the administrative password to enable the user to override the request for the user password. This reduces or eliminates the efficiency of the administrator password.

In some network computer systems associated with a network/corporate framework that prevents unauthorized users from accessing certain local system and network features of the computer, administrative security features are placed on the machine by a system administrator. The administrator configures the computer system with a master/administrative password. The user is then given access to the computer and the opportunity to establish his/her own user password. In some instances, more than one user password is required, (e.g., one to gain access to the computer system and another to gain access to the hard file of the computer system).

Complex passwords are often difficult to remember. Even with simple passwords, however, it is not uncommon for the user to forget his/her boot-up password. Since the computer system cannot be accessed without entry of a correct password, the user is then forced to seek administrative assistance to access the computer system.

For most systems, administrative assistance is provided to the user via a known/available telephone number of the administration center (server and personnel). In some situations, a help center is provided to assist the user of the computer system with any problems encountered when operating the computer system, including boot-up password assistance.

One of the more common help center (administration) calls is from users who forget their Power on Passwords or hardfile passwords. The most common model for addressing this problem by remote administration, is for an administrator to tells the user over the phone the administrative ("admin") or hardfile master passwords. However, giving the administrative password to each user who calls in breaks the security model for administrative passwords, and thus proves to be ineffective across a network environment. A new administrative password would have to be set each time someone forgets his/her user password.

The present invention realizes that it would be desirable to have a method to securely recover a system without compromising other systems and/or administrative passwords in the network. A method and system that provides legitimate users with access to their computer system if they have forgotten or lost their password without compromising the administrative passwords would be a welcomed improvement. These and other benefits are provided by the disclosed invention.

SUMMARY OF THE INVENTION

Disclosed is a method, system, and program product for enabling administrative recovery of a user's lost/forgotten boot-up passwords without compromising the administrative/master password(s). A restricted-use password is dynamically generated from a first hash of a random number generated on a client system and a secret retrieved from a secure device associated with the client system. The restricted-use password operates as a master password but is not the administrative password of the client system. Once the password is generated, it is provided to the user/client system to enable user access to said client system and hardfile and reset of the user passwords.

The restricted-use password is limited to a single use only, and the password is no longer valid for accessing the client system after an initial use. The secret is stored within a trusted platform module (TPM) or a secure non-volatile random access memory (NVRAM). The random number is automatically generated following receipt of a triggering condition. The triggering condition may be either a pre-established number of failed attempts by a user of the client system to access the client system and/or a hardfile during boot up of the system or entry of a predefined key sequence on an input device of the client system.

The hash and random number are received at an administrative server that stores a copy of the secret and the administrative password of the client system. The server generates a second hash from the copy of the secret and the received random number, and compares the second hash to said first hash. When the second hash matches the first hash, and the client system/user is authenticated for receiving a restrictive-use password, the restrictive-use password is generated by hashing the second hash with the secret.

A secure communication path is established between the user/client system and the administrative server prior to initiating a generation of said second hash and said restrictive-use password. In one implementation, a GUI is provided and the user is prompted for entry of credential information to gain access to a restrictive-use password generation utility on the server. When the user is authenticated and the one-time password generated, the password is passed to the user/client system, where it is utilized to access the system.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and program product for implementing administrative support during system boot-up when a preset, boot-up password is forgotten by the user of the system. The invention is applicable to a corporate or networked environment having one or more computer systems that are setup/configured with an administrative password and a master password on the computer system's hardfile. As is known in the art, hardfiles support two types of passwords, a user password and a master password. The user password in the password normally used by the system user to gain access to the hardfile, while the master password is normally set by the administrator and is primarily used to reset the user password.

Implementation of the invention requires the authorized user first set a power on and/or a hardfile password. Later, when/if the user forgets his power on and/or hardfile passwords, a process is initiated by which the user is provided a one-time usable password to gain access to the computer system without revealing or compromising the administrative password/privileges.

Two different embodiments are provided herein, each resulting in the user receiving a one-time usable, boot-up password. Each embodiment respectively entails one of the two processes, which are both described below with reference to specific one of the flow charts. However, the automated features of the invention are preferably implemented within a computer system (user system and/or server system), which may be configured similarly to the computer system illustrated in FIG. 1 and now described.

Figure 1:
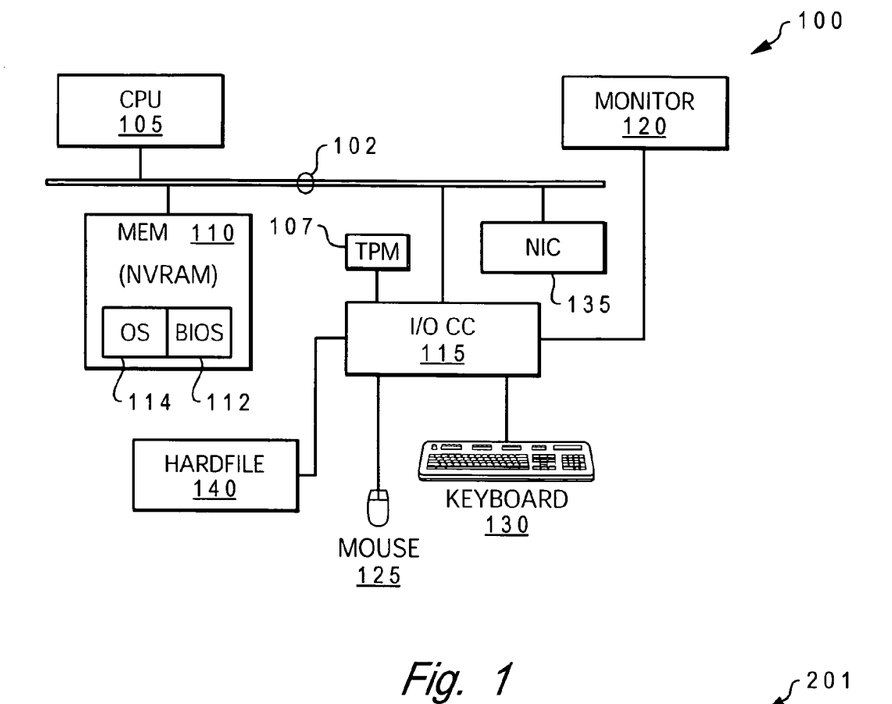
FIG. 1 is a block diagram illustrating a computer system within which several features of the invention may advantageously be implemented.

FIG. 1 generally illustrates a block diagram of a computer system within which the boot-up password verification processes may be completed, in accordance with one embodiment. Computer system 100 comprises central processing unit (CPU) 105, memory 110 and input/output (I/O) channel controller 115, each interconnect via a system bus 102. Computer system 100 also includes a trusted platform module (TPM), which stores a secret utilized in the one implementation of the invention. Those skilled in the computer arts are familiar with TPMs and the functionality attributed thereto.

I/O CC 115 provides connection to and control over various I/O devices, of which mouse 125, keyboard 130, and monitor 120 are illustrated. Computer system also comprises network interface card/adapter 135, which is utilized by the computer system 100 to access a remote system via a network.

In addition to memory 110, computer system includes a hardfile 140, which is a storage facility of the computer system. When access to hardfile 140 is restricted, a separate hardfile password is required during boot-up to enable user access to the contents of hardfile 140. Within memory 110 is stored operating system (OS) 114 and functional components of the basic input output operating system (BIOS) 112. BIOS 112 is an internal OS that performs various system checks and configuration during power on of the computer system, including the power-on self test (POST) operation. Those skilled in the art are familiar with POST and the power-on process as well as with general application of BIOS. However, the invention further extends the functionality of BIOS to include specific automated software-enabled functions geared towards enabling user password authentication and triggering one-time administrative password override when the user fails to enter (or forgets) a valid user password during power on.

Figure 2:
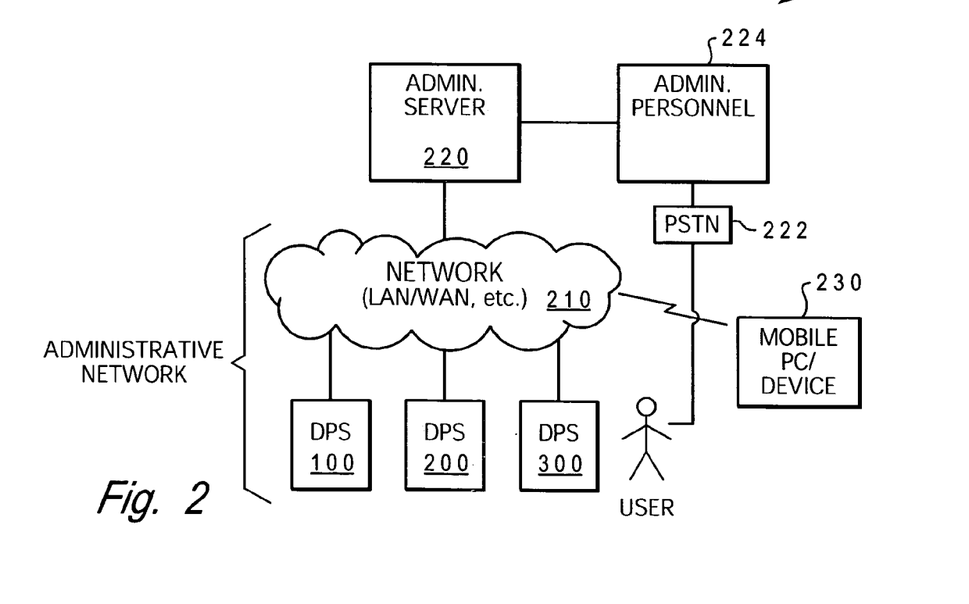
FIG. 2 is a block diagram representation of a network environment with administrative functionality provided via a network server according to one implementation o the present invention.

Key features of the invention are carried out in a network environment, which may be configured similarly to that illustrated by FIG. 2. Network environment 201 includes a network backbone 210, which may represent a local area network (LAN) or wide area network (WAN) depending on the specific implementation. Connect to network backbone 210 are administrative server 220 and networked computer systems, including computer system 100 and other systems 200, which may be similarly configured. Additionally, other mobile devices 230 may connect to the administrative server 220 via wireless or other medium to the network backbone 210.

Administrative server 220 is controlled/monitored by administrative personnel 224. These administrative personnel are in turn accessible via a telephone system 222. The server and personnel together monitor the administrative network of user computer systems. A service call placed by a user is answered by administrative personnel 224. The user may be required to provide some authentication information to the administrative personnel prior to initiating the password retrieval system. Once this authentication is completed, the communication is assumed to be secure.

The specific illustration and description of computer system and network environment are meant solely for illustration and not meant to imply any limitations on the invention. In one embodiment, each device, including the server is a stand alone system (i.e., not networked) and support for the computer system 100 during boot-up is provided solely by direct connection to the server and/or the administrator with access to the server. However, the illustrative embodiments are described from the perspective of an administered computer system, which access a network server via some background network connection. Other variations of this embodiment are contemplated as falling within the scope of the invention.

Figure 3:
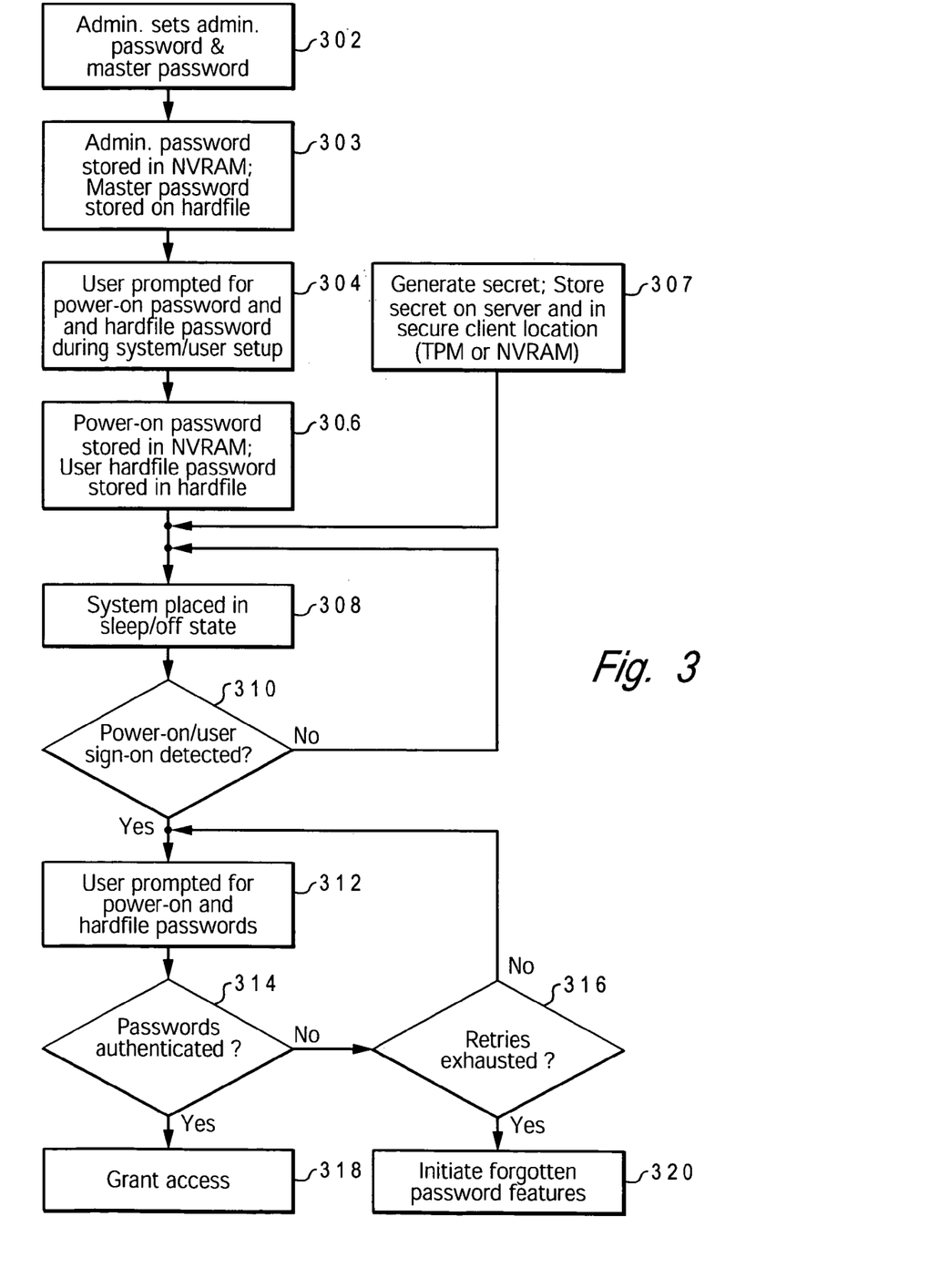
FIG. 3 is a logical flow chart of the process of setting up master and administrative passwords for a computer system in accordance with one embodiment of the invention.

With reference now to the flow charts, and particularly FIG. 3, which illustrate setting-up/configuring computer system 100 with boot-up and master/administrative passwords. The administrative password is set to a known value by the administrator before the computer system is made available to the user. The hardfile is also initialized with a master password which can be used to reset a hardfile user password. The process begins at block 302, which shows the administrator setting up/configuring the computer system with an administrator password and a hardfile master password. The administrator passwords is then stored in the secure NVRAM of the computer and the master password is stored on the hardfile, as shown at block 303. When the authorized user first accesses the computer, the user is prompted to set both a boot-up and a hardfile password at block 304. The Power on password is stored in NVRAM, and the hardfile user password is stored in the hardfile of the computer system, as indicated at block 306.

At block 307, a secret is generated (e.g., a random number or other number) and this secret is stored both on the administrative server and on the client computer system. In one exemplary embodiment, the TPM services are utilized to store the data; However, in another embodiment, the data is stored in a secure NVRAM location. The computer is then placed in an off or hibernation state until powered on again, as shown at block 308.

At block 310, the BIOS (or hardware) monitors for a subsequent power-on of the computer system, and, as indicated at block 312, during power-on of the computer, the user is prompted for the boot-up and hardfile passwords. A first determination is made at block 314 whether the user-entered passwords are authenticated, and if not, a second determination is made at block 316 whether the number of allowed retries is exhausted. When the correct passwords are entered, the user is granted access to the computer system as shown at block 318. If, however, the user has forgotten or incorrectly enters his boot-up and/or hardfile passwords (and exhausts the number of available retries), a process is initiated at block 320 by which the user is provided a one-time usable password to gain access to the computer system and reset the user passwords. The process is completed such that the administrative password/privileges are not revealed or compromised during the process.

Figure 4A:
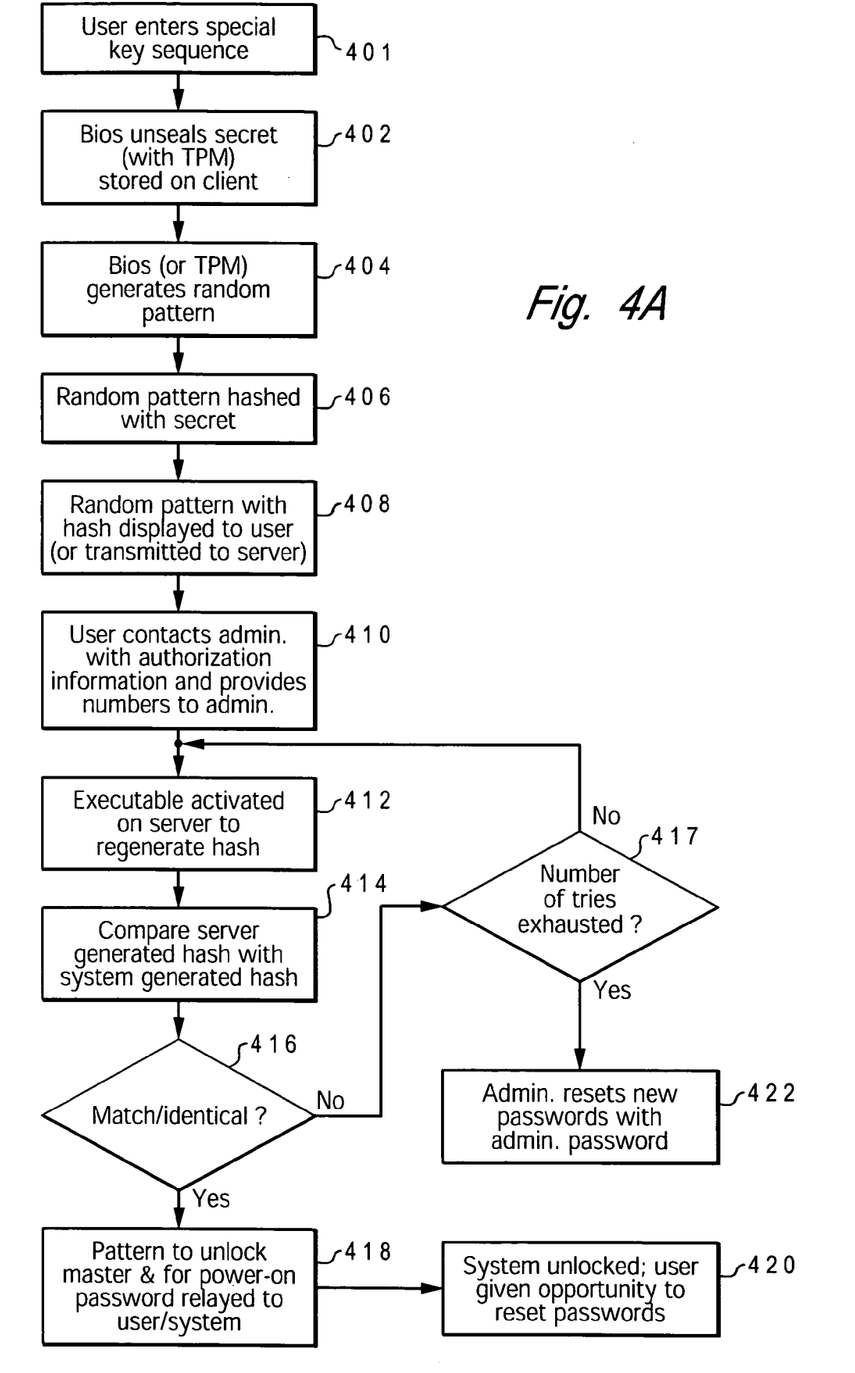
FIG. 4A is a logical flow chart of the process of generating a one-time user password to enable power-on access to the computer system according to a first embodiment of the invention.
Figure 4B:
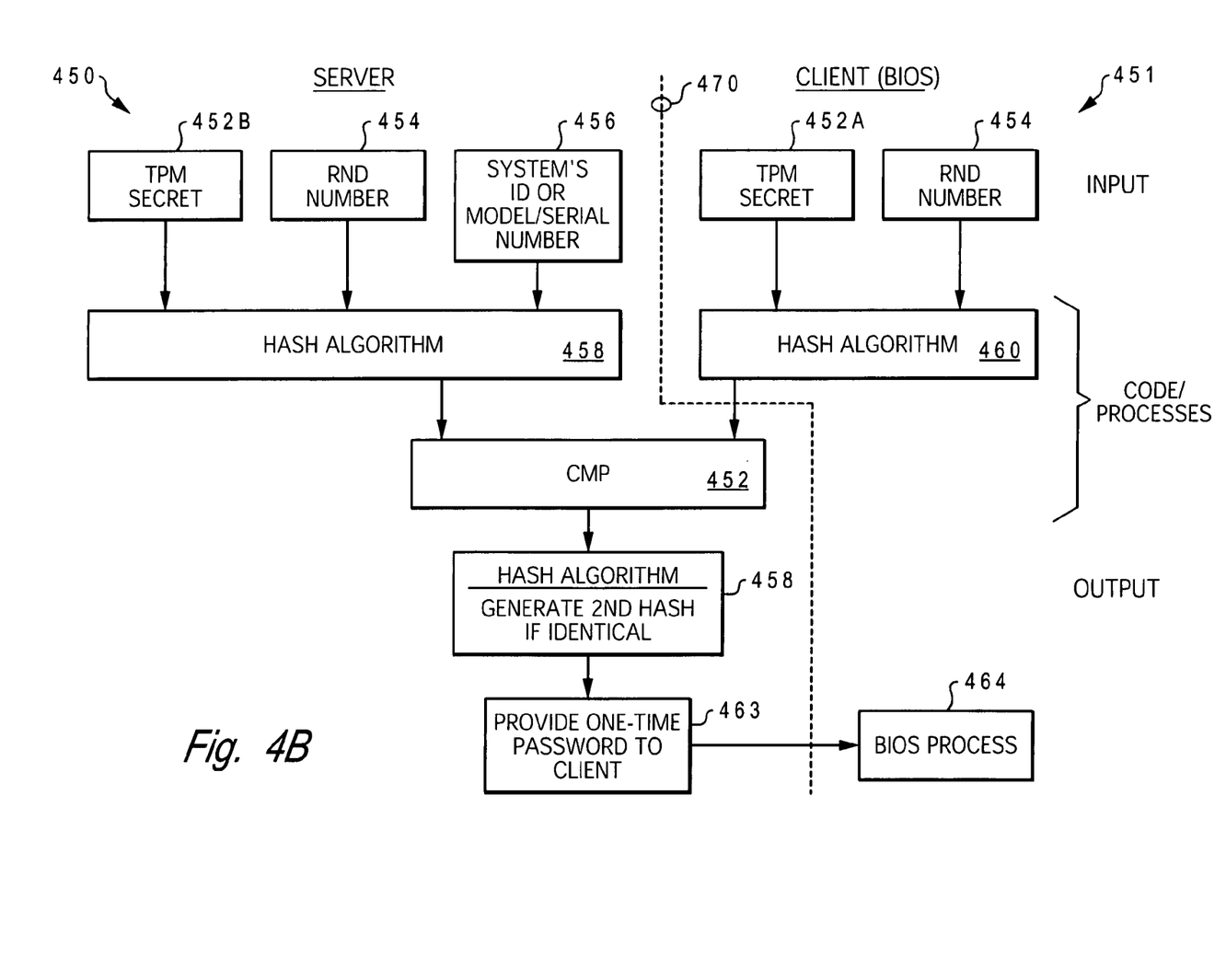
FIG. 4B is a logical flow schedule of generating hash values and comparing the hash values during creation of a one-time user password that enables power-on access to the computer system according to the first embodiment of the invention.

FIGS. 4A and 4B illustrate the process by which a one-time useable password is generated and utilized according to a first embodiment. Some of the functional features of the invention are programmed into the BIOS of the computer system and, as shown at FIG. 4B implemented at the client side 451 of the process. Other functional features are programmed into the server at server side 450 of the process. For simplicity of description, the programmed server-side features are assumed to be carried out by a password generation utility (or password utility) and are referred to as such throughout the description. Notably, both client-side 451 and server side 450 include respective hashing algorithm 460 and 458, which take as input at least the TPM secret (or administrative password) 452A, 452B and the generated random number 454. Each side maintains a copy of the TPM secret (i.e., 452A at client side 451 and 452B at server side 450) in a secure location, while the random number 454 is generated at the computer system and passed to the server side 450 during transfer of data to initiate the generation of the one-time access password.

In addition to these values, server side 450 has hash algorithm 458 that, in one implementation, also takes system authentication or identification parameters 406 as inputs. These parameters (406) are passed to server side 450 from client side 451 and are utilized to complete a validation that the person requesting the one-time access (for password reset) is the authorized user. This enables the security of the process to be confirmed by comparing the parameter to the TPM secret 452B or other mechanisms for confirming the security. The system authentication or identification parameters are transmitted from client side 451 to server side 450 at or around the time the random number is transmitted/communicated.

Both hash algorithms 460, 458 generates results that are sent through a comparator 462 at the server side 450, and the result 414 generated by the comparator 462 determines whether the one-time access password should be generated. At that time, if the data matches, the TPM secret 402B will be hashed with the hash generated at the server side (408) at the hash algorithm 458. The resulting one-time password 463 is transmitted to the client, where the password is entered into a BIOS process 464 to access the system and hardfile.

While the illustrative embodiment of the invention is described utilizing a secure hash algorithm (SHA-1), the invention may be implemented with other hashing algorithms, a message digest algorithm (e.g., MD5), or a similar algorithm. As is known in the art, SHA-1, takes a message of varying length and produces a fixed length message digest.

In one implementation, this process is triggered by a special key sequence during power-on (e.g., holding down "ALT" or "CTRL" and "F7" at the same time). Alternatively, the user may be prompted with a query to initiate a retrieval of a one-time access password after exhausting the requisite number of tries to enter the correct password. Thus, referring now to FIG. 4A and as shown at block 401, the user enters a special key sequence to initiate the one-time password recovery mode. Then, at block 402, the BIOS responds by unsealing a secret with the trusted platform module (TPM). The secret was previously placed in the system (as shown in block 307 of FIG. 3, described above). Any method of unsealing the secret with the TPM may be utilized, and the particular method is not the focus of the invention. However, a general description of this process is found at world-wide-web (www) secure Internet site (https) of trustedcomputinggroup.org/home. When multiple computer systems are supported by a single administrative entity, each computer system may be provided with a unique secret and the processing at the server thus generates a different one-time override-password from one client computer system to the next.

Returning to the figure, at block 404, the BIOS (or TPM) generates a random pattern, which is hashed with the secret at block 406. In one implementation, biometric and system data (e.g., machine type and model) are also added to this hash. The random pattern and the hash are displayed to the user at block 408. The user contacts (via phone or other communication medium) the administrator (administrative personnel) and authenticates himself to the administrator before providing these numbers to administrator at block 410. In another implementation, the random pattern and hash are electronically transmitted from the computer system to the administrative server directly with/without being displayed to the user. This implementation enables additional automation in the process and requires the computer system to have internal mechanisms for communicating to the server at the network level without the user having access beyond the authentication stage of the boot-up process.

When the two values are received by the administrator (or by the administrative server), an executable is initiated/triggered on the server to regenerate the hash from the random number, as shown at block 412. This process requires the server be provided the secret for that computer system during the initial setup of the system (i.e., at block 307) or received at some other time before or along with the other values. In the non-automated method, the administrator enters the random number as data for the executable that is run on the server.

Then, the hash generated by the client computer system is compared with that generated at the server at block 414, and a determination made at block 416 if the two hash values are identical. If the hash values are not identical, a next determination is made at block 417 whether the user has exceeded a preset number of tries. When the present number of tries have been exhausted, a failure is recorded and the administrator has to reset the computer system with the administrative password via manual method, as indicated at block 422. However, if the hash values are identical, the one-time usable pattern to unlock the master and power-on passwords is relayed to the user/system at block 418. This part of the process is accomplished by the hashing the random number used in block 401 with the hash generated in block 412. Since this number can also be generated at the client, the client can use this number as a one-time password. The user then unlocks the computer system, and the BIOS may prompt the user to reset the boot-up and/or hardfile passwords at block 420. The one time password cannot be utilized again to access the computer system since the random number generated in step 406 will not be generated the next time this process is used.

When the process is not automated, the administrator relays the appropriate pattern to the authorized user for entry into the password prompt on the client computer system. Entry of the one-time password unlocks the master and/or the power on password. When not automated, the relay of the one-time password (pattern) is completed over the telephone (or other user accessible medium, such as email). However, when automated, the pattern is electronically transmitted to the computer system, and the BIOS or other "password-retrieval" executable unlocks the system using the received pattern. This automated process is particularly applicable to service processors.

The pattern provided by the server is unique for the boot process since it is derived from the random number generated by the particular computer system as well as from an additional secret protected by the TPM. The unique pattern is utilized in lieu of the actual administrative password and eliminates the need for providing the actual administrative password. In one embodiment, the stored secret may actually be the admin password, eliminating the need for storage of an additional parameter.

Figure 5:
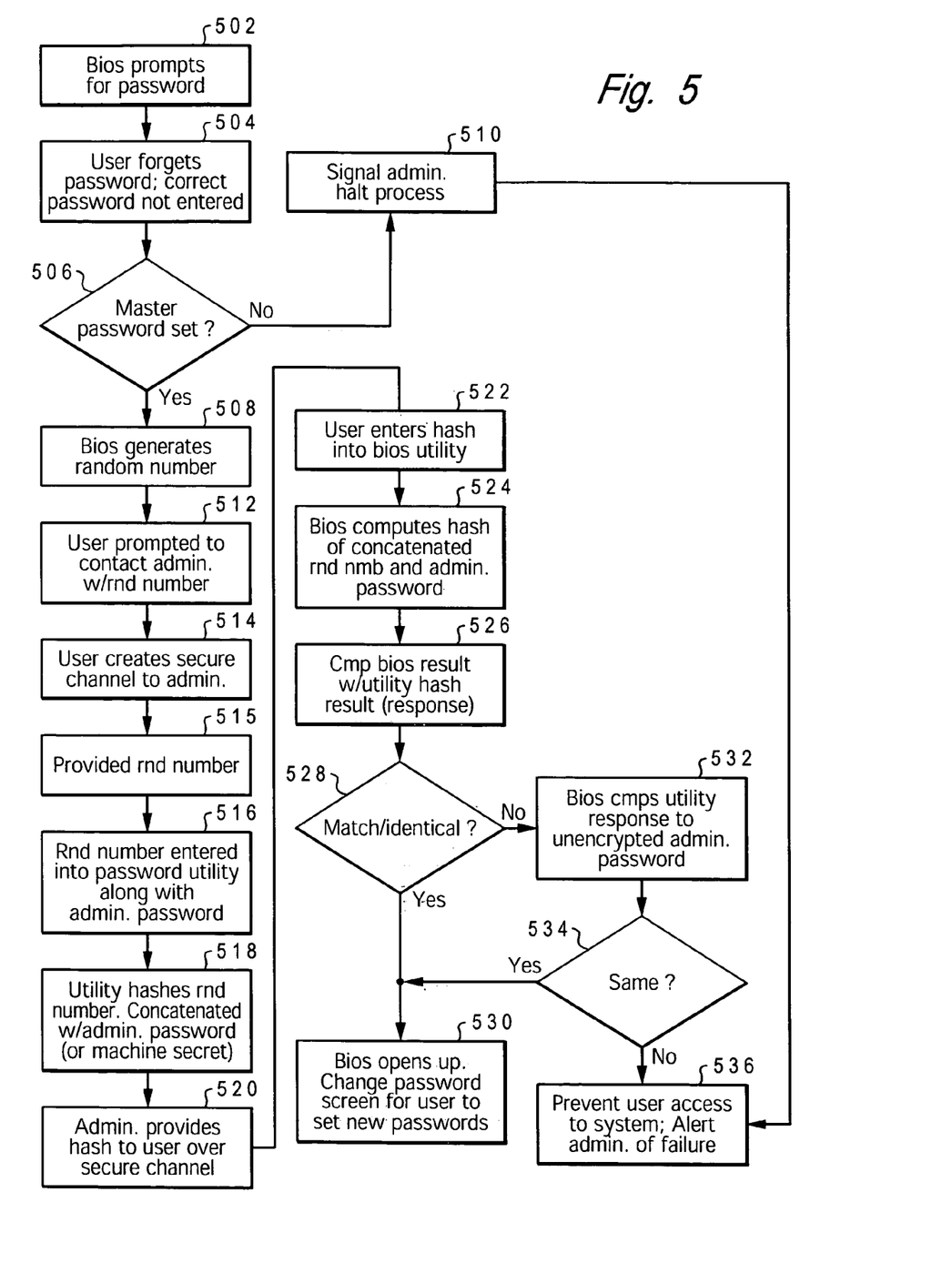
FIG. 5 is a logical flow chart of another process of generating a one-time user password to enable power-on access to the computer system according to a second embodiment of the invention.

FIG. 5 illustrates a second embodiment by which a one-time access boot-up password is generated without revealing the administrative password. The process begins at block 502 at which the BIOS prompts the user for the power on and/or hardfile password(s). The user either forgets the password or enters an incorrect password or does not enter a password within a preset time period at block 504. After the occurrence of one of the above or after a preset number of incorrect entries (e.g., three attempts) or a special key sequence, the BIOS checks whether the administrator/master password is set for the computer system, at block 506. If these passwords are not set, the process is halted and the user alerted to inform/contact the administrator, as indicated at block 510. Alternatively, an automatic signal is generated and transmitted to the server via the network connection indicating that the computer system boot-up has failed due to an incorrect or forgotten password.

When the master password is set, however, the BIOS generates a random number at block 508. The BIOS then presents a message with the random number appended thereto or enclosed therein directing the user to contact the administrator, as indicated at block 512. For example, a message stating "Admin Challenge: 1245, contact your administrator for response" may be displayed, where "1245" is the random number. The BIOS then suspends boot-up operations and waits for input (by the user or from the administrative server via the network).

At block 514, the user creates a secure channel with the administrator. The secure channel is created by the user calling the help desk and identifying himself/herself by out-of-band mechanisms. For example, a hint may be utilized, such as, "mother's maiden name." Also, some method by which the company recognizes the individual (e.g., company serial number, etc.) may be utilized. According to the exemplary embodiment, the out-of-band mechanisms utilized are the telephone and through a login session in the secure channel.

Once the secure channel is established, the random number is provided over the secure channel, as shown at block 515. The random number is associated with the user (or client computer system), and at block 516, the random number is entered into an executable application (password generation utility) along with the administrative password of the administrator for that system. The password generation utility hashes the random number concatenated with the administrative password at block 518 and generates a hash. In one embodiment, a machine secret is provided rather than the administrative password, although both may be the same in particular implementations. The administrator then provides the hash to the user over the secure channel, as shown at block 520.

The user types in the hash into the query/prompt screen of the BIOS utility at block 522. The BIOS then computes the hash of the concatenated random number and the administrative password (or secret) at block 524. The hash generated by the administrative server is then compared to the BIOS-generated hash at block 526, and a decision made at block 528 whether they are the same (or identical) to each other. When the hash results are identical, the BIOS provides access to the computer system and opens up the change password screen to allow the user to change the user password, as shown at block 530.

If the hash results are not identical, however, (or if the administrator does not presently have access to the utility), the administrator may give the administrative password to the user, perhaps in encrypted form. The user then enters the administrative password, and the BIOS compares the BIOS' administrative password to the un-encrypted administrative password, as indicated at block 532, and a check made at block 534 whether the two values are the same. If the BIOS' administrative password is the same as the unencrypted administrative password, the process returns to block 530 at which the BIOS provides access to the computer system and opens up the change password screen to allow the user to change the user passwords. However, if the values do not match, the user is prevented from accessing the system at block 536, and, in one embodiment, the administrator is alerted of the failure.

As indicated above, a separate secret may be utilized in place of the administrative password. Also, a different secret may be utilized for each machine within the administrative network, and the machine identification would also be required in addition to the random number of the challenge. With one implementation of this embodiment, the machine name or serial number are also hashed into the challenge and response (hash). This implementation further eliminates the need to establish the machine identification as part of setting up the secure channel.

Figure 6:
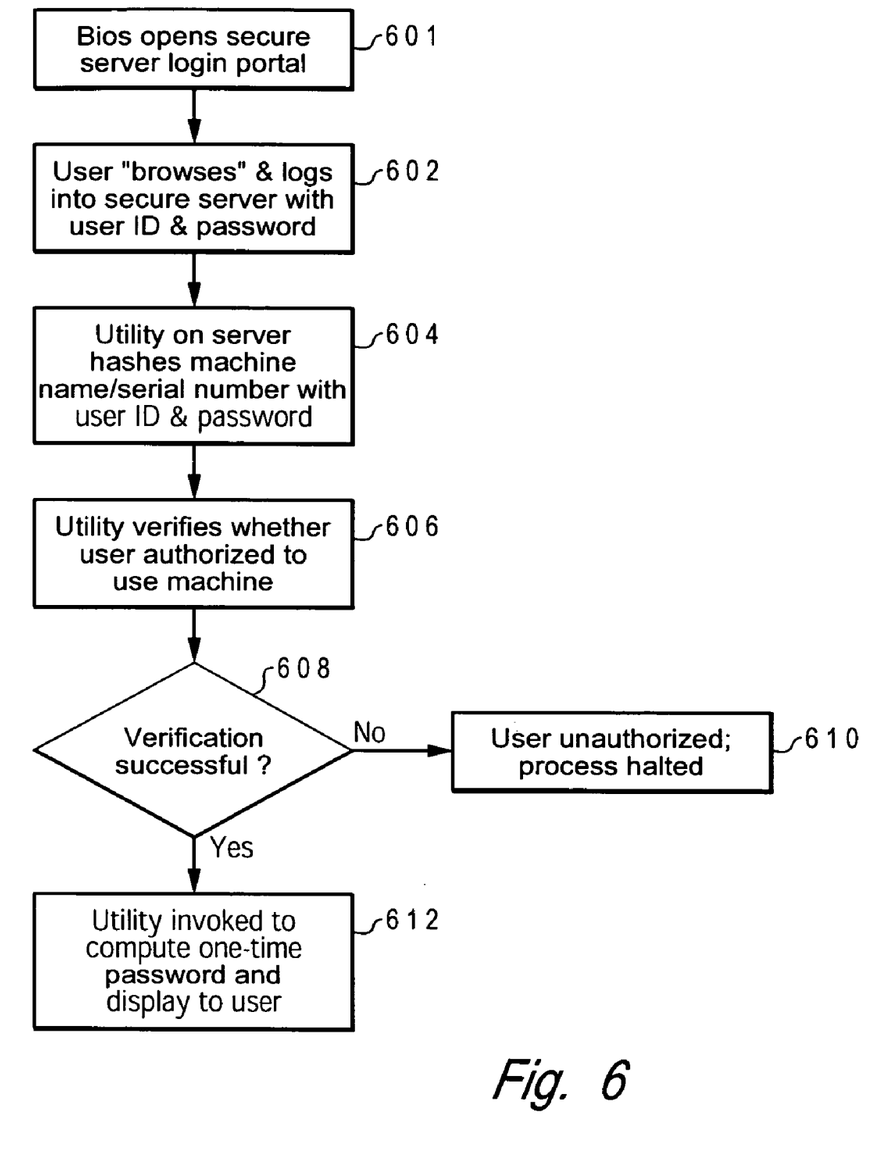
FIG. 6 is a logical flow chart of an automated process of generating a one-time user password via web-access to a server in accordance with one embodiment of the invention.

Automation of the process of FIG. 5 is completed via establishment of a secure channel, which automated process is partially illustrated by FIG. 6. As shown at block 602, the user browses to a secure web server (e.g., using https protocol) and logs into the server with a pre-established user authentication parameters (e.g., user ID and password). The password utility is triggered and retrieves the machine name or serial number from the transmitted frames/packets, and then hashes the user authentication parameters with the machine name or serial number at block 606. The secure web server verifies at block 608 whether the user is authorized to use the particular computer system. When the verification is successful, the secure web server invokes the password utility to compute the hash, and the password utility computes the hash and displays the hash to the user at block 612. However, when the verification is unsuccessful, the unauthorized process is halted at block 610.

In one implementation, the above described automation is further improved when the BIOS has the necessary mechanism to initiate a communication with the secure web server without providing the user with access to other functions and the hardfile of the computer. In this implementation, the BIOS may prompt the user for the user ID and password, then complete the automated transaction described above.

The embodiments illustrated by FIGS. 4A–4B and 5 and described above may be enhanced to work with automation and allow for more enhanced/diverse communication methods, other than a telephone call to the administrative helpdesk. The embodiment of FIG. 4A provides the advantage that the computer system must authenticate before the administrator responds to the request for a one-time access password. Thus, the administrator is better able to resist dictionary attacks on the network. The embodiment of FIG. 5 requires communication of less data by the user or computer system. Irrespective of the method utilized, however, with either method, the administrative passwords are kept secure and are not left open to attack.

The methods of the invention are different from that provided in U.S. Pat. No. 6,370,649 because the methods of the present invention utilize a secret stored in a TPM to assist in the recovery protocol. Further, the methods provide a high level of automation of processes, both at the client computer system and at the client system-to-server interface. No shared counter is required to provide individually distinguishable one-time usable passwords, and there is no requirement for decryption/encryption logic.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   dynamically generating a restricted-use password from a first hash of a random number generated on a client system and a secret retrieved from a secure device associated with the client system, wherein said restricted-use password operates as a master password but is not the administrative password of the client system; and
   enabling access to said client system and hardfile and reset of user passwords via said restricted-use password.

2. The method of claim 1, wherein said restricted-use is a single use only, such that said password is no longer valid for accessing said client system after an initial use.

3. The method of claim 1, wherein said secure device is a trusted platform module (TPM).

4. The method of claim 1, wherein said secure device is a secure non-volatile random access memory (NVRAM).

5. The method of claim 1, further comprising:
   automatically generating said random number following receipt of a triggering condition from among a pre-established number of failed attempts by a user of the client system to access said client system and/or a hardfile hosted on said client system following power-on of said system and entry of a predefined key sequence on an input device of the client system.

6. The method of claim 1, further comprising:
   receiving said hash and said random number at an administrative server that stores a copy of the secret and the administrative password of the client system;
   generating a second hash from the copy of the secret stored at the administrative server and the random number;
   comparing said second hash to said first hash; and
   when said second has matches said first hash and the client system is authenticated for a specific restrictive-use password, passing said specific restrictive-use password to said client system.

7. The method of claim 6, further comprising generating the restrictive-use password by hashing the second hash with the secret, wherein said secret is one of a unique secret provided for the client system and the administrative password.

8. The method of claim 1, further comprising:
establishing a secure communication path between said user and said administrative server prior to initiating a generation of said second hash and said restrictive-use password; and
authenticating the user as authorized to access the client system prior to generating said restrictive-use password.

9. The method of claim 8, wherein said establishing a secure communication path includes providing an Internet accessible path to the server, wherein said user enters required credential information within a browser on the client system to gain access to a restrictive-use password generation utility on said server.

10. The method of claim 9, further comprising:
displaying a graphical user interface with prompts for the user to enter a series of authorization credentials and said random number and first hash; and
responsive to a verification of the authorization credentials entered by the user, providing the user with said one-time use password.

11. The method of claim 1, further comprising:
passing said second hash to said client system; and
comparing at said client system said second has to said hash; and
enabling access to said client system only when said second hash matches said first hash.

12. The method of claim 1, wherein said first hash and second hash includes biometric and system data.

13. A system comprising:
an administrative server having a password-generation utility and storage mechanism for storing client administrative passwords and client identification data;
a client system having a hardfile and which are respectively accessible to a user via a power-on and a master password that are entered by the user during power-on of the client system;
a password security mechanism that enables generation and use of a one-time password for providing user access to said client system outside of said power-on password and said master password, without revealing the administrative password for hat client system.

14. The system of claim 13, further comprising:
an electronic network connecting the client system to the server; and
wherein said client system includes means for automatically connecting to said server via said electronic network when a password generation trigger occurs, said password generation trigger being one of a failure by the user to correctly enter said power-on and master passwords and an entry by said user of a predefined sequences on an input device of the client system.

15. The system of claim 14, wherein said client system further comprises:
a hash generation algorithm that generates a first hash from a secret stored on a secure device of the client system and a random number generated at said client system; and
a transmitting device for transmitting said first hash along with said random number to said server over said network.

16. The system of claim 15, wherein said server further comprises:

a device for receiving said first hash and said random number from said client system;
triggering mechanism for initiating an execution of the password generation utility, wherein said password generation utility:
verifies said client as a secure client;
generates a second hash of the random number and a copy of the secret pre-stored within the storage mechanism of the server;
compares the second hash to the first hash; and
responsive to the second hash matching the first hash, transmitting to the client system via a transmitting device a one-time use password that provides access to said client system and said hardfile.

17. The system of claim 16, wherein said client system further comprises:
a graphical user interface with prompts for the user to enter a series of authorization credentials and said random number and first hash and responsive to a verification of the authorization credentials entered by the user at the server, provides the user with said one-time use password; and
a password update mechanism, which provides said user with access to said client system and said hardfile utilizing the one-time use password, wherein the user is prompted for entry of new access password and hardfile password.

18. A computer program product comprising:
a computer readable medium; and
program code on said computer readable medium for:
dynamically generating a one-time use password from a first hash of a random number generated on a client system and a secret retrieved from a secure device associated with the client system, wherein said single-use password operates as a master password but is not the administrative password of the client system and wherein said single-use password is no longer valid for accessing said client system after an initial use, wherein further said secure device if from among a trusted platform module (TPM) and a secure non-volatile random access memory (NVRAM); and
enabling access to said client system and hardfile and reset of user passwords via said one-time use password.

19. The computer program product of claim 18, further comprising program code for:
automatically generating said random number at said client and initiating the dynamic generation of the restrictive-use password responsive to a trigger from among at least one failed attempt by a user of the client system to access said client system and/or a hardfile hosted on said client system following power-on of said system and entry by a user of a predefined key sequence on an input device of the client system.

20. The computer program product of claim 19, further comprising program code for:
establishing a secure communication path between said user and said administrative server prior to initiating a generation of said second hash and said restrictive-use password;
receiving said hash and said random number at an administrative server that stores a copy of the secret and the administrative password of the client system;
authenticating the user as authorized to access the client system prior to generating said one-time use password.

generating a second hash from the copy of the secret stored at the administrative server and the random number;

comparing said second hash to said first hash; and when said second has matches said first hash and the client system is authenticated for a specific restrictive-use password, generating the restrictive-use password by hashing the second hash with the secret, wherein said secret is one of a unique secret provided for the client system and the administrative password; and passing said specific one-time use password to said client system.

21. The computer program product of claim 20, further comprising program code for:

displaying a graphical user interface with prompts for the user to enter a series of authorization credentials and said random number and first hash;

establishing a secure communication path via an Internet accessible path to the server, wherein said user enters required credential information within a browser on the client system to gain access to a restrictive-use password generation utility on said server; and responsive to a verification of the authorization credentials entered by the user, providing the user with said one-time use password.

22. The computer program product of claim 18, said program code further comprising code for:

receiving said second hash to said client system; and comparing at said client system said second has to said first hash; and enabling access to said client system only when said second hash matches said first hash.

* * * * *